Aug. 12, 1941.         E. R. CHILD         2,252,284
CONTROL SURFACE TAB MECHANISM
Filed April 6, 1940         2 Sheets-Sheet 1

INVENTOR
EDWARD RUSHMORE CHILD.
BY
ATTORNEY

INVENTOR
EDWARD RUSHMORE CHILD
BY
ATTORNEY

Patented Aug. 12, 1941

2,252,284

UNITED STATES PATENT OFFICE 2,252,284

CONTROL SURFACE TAB MECHANISM

Edward R. Child, Buffalo, N. Y., assignor to Curtiss-Wright Corporation, a corporation of Delaware Application April 6, 1940, Serial No. 328,281

6 Claims. (Cl. 244—82)

This invention relates to aircraft control systems and is particularly concerned with improvements in control mechanisms for auxiliary airfoils on movable control surfaces, commonly known as trim tabs.

An object of the invention is to provide a mechanism for controlling the position of the trim tab in response to movement of the control airfoil, an associated object being to provide mechanism of such form that the path of movement of the trim tab may be varied in any desired degree with respect to control airfoil movement— that is, the trim tab moves in response to control airfoil movement but its movement may be predetermined to partake of greater or lesser angular movement about its hinge than the movement of the control airfoil about its hinge. Thus, the trim tab may be used either as a servo control for the control airfoil, or as a pure trimming device for determining the neutral position of the control airfoil, or as means for augmenting the aerodynamic action of the control airfoil when the latter is moved by the aircraft operator.

The invention has for a further object the provision of affording trim tab movement of varying degree on either side of neutral for the same displacement of the control airfoil on either side of neutral.

A further object of the invention consists in the provision of trim tab controlling mechanism which may be altered at will by replacing certain elements of the system with others adapted for a different series of trim tab control movements.

Further objects of the invention will be apparent in considering the detailed description below in conjunction with the drawings, in which.

The drawings show the invention as applied to a wing and aileron combination but it will be obvious as the description proceeds that the teachings of the invention may be applied with equal facility to other control airfoil assemblies, such as a stabilizer-elevator assembly or a fin-rudder assembly. Where the term "wing" and "aileron" are used below, they are to be construed as covering also stabilizing and control surfaces respectively.

Figure 1:
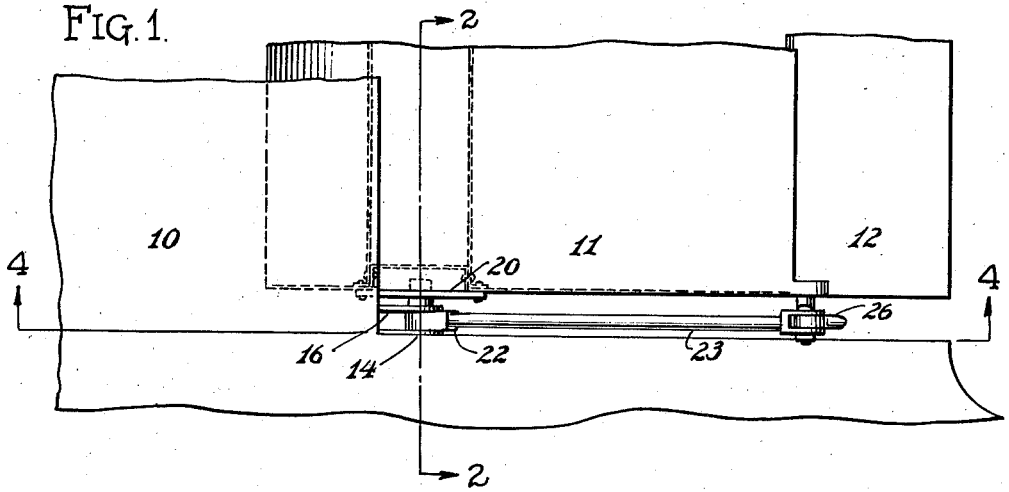
Fig. 1 is a fragmentary plan of an aircraft wing incorporating the invention.
Figure 2:
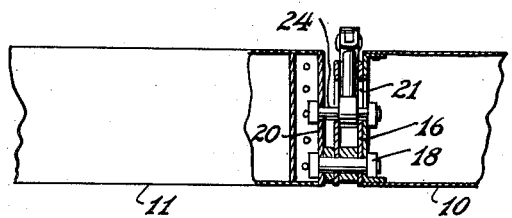
Fig. 2 is a section on the line 2—2 of Fig. 1.
Figure 3:
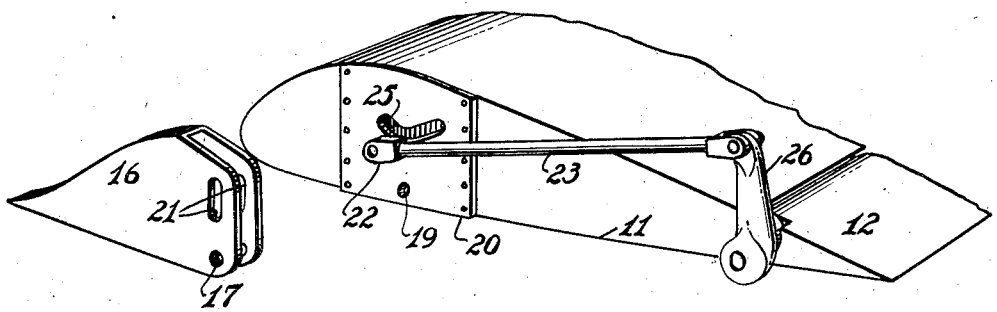
Fig. 3 is a perspective elevation of elements of the invention.

In the drawings, 10 represents a wing at the trailing edge of which an aileron 11 is disposed, the aileron carrying at its trailing edge a trim tab 12 hinged thereto on an axis 13. The aileron 11 is hinged to the wing 10 at 14. As shown particularly in Fig. 3, the trailing edge of the wing carries a rearwardly extending bracket 16 in the form of parallel plates which are provided with apertures 17 through which a hinge pin 18 passes, the latter being engaged in an aperture 19 in a plate 20 secured to an end of the aileron. Above the hinge opening 17 on the member 16, substantially vertical slots 21 are formed and between the plates is an end fitting 22 of a connecting rod 23, the fitting 22 carrying a follower pin 24 engaged in the slots 21. This pin extends laterally to engage a curved slot 25 formed in the plate 20.

The rod 23 is clevised at its rear end to a horn 26 rigid with the trim tab 12.

Figure 4:
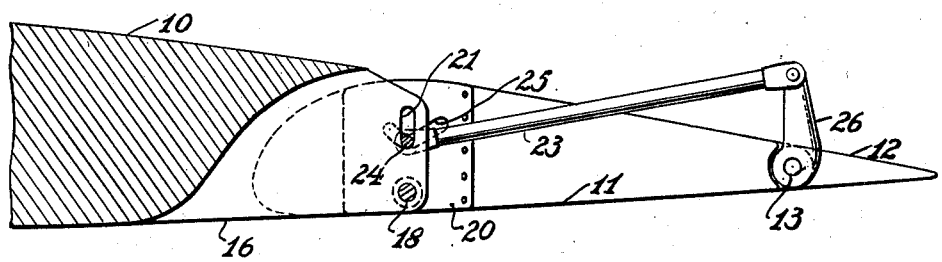
Fig. 4 is a section on the line 4—4 of Fig. 1.
Figure 5:
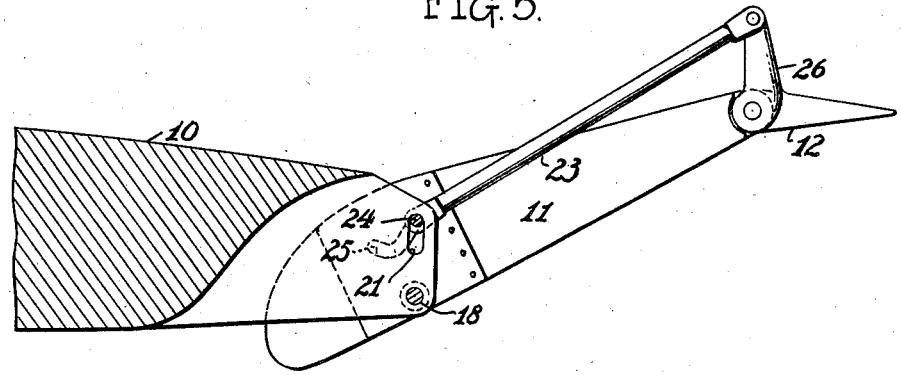
Figs. 5 and 6 are sections, similar to Fig. 4, showing the mechanism in different positions of adjustment.
Figure 6:
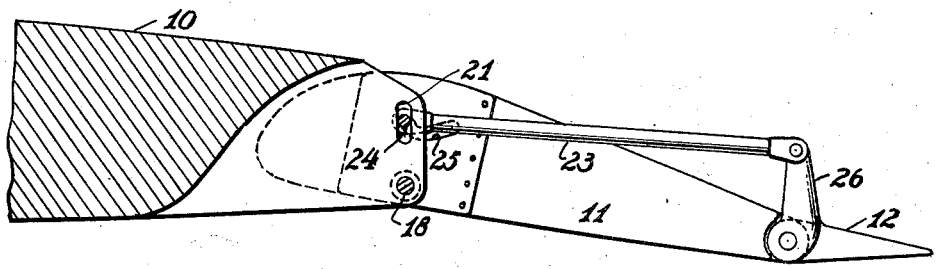

In referring to Figs. 4 to 6, it will be seen that when the aileron is in its neutral position, the slots 21 and 25 overlap in such relationship that the pin 24 positions the trim tab 12 in a neutral attitude.

If the aileron be moved upwardly by conventional means (not shown), the slot 25, when formed as shown, forces the pin 24 upwardly in the slot 21 to the end that the trim tab 12 maintains substantial parallelism with the chord of the wing 10 but, with respect to the aileron, it is moved down.

As shown, the slots 21 and 25 are so related to one another that the trim tab 12 acts as a servo device to reduce control forces imposed by an operator on the aileron 11. However, the slots 21 and 25 which act as cams to affect the position of the pin 24, the latter comprising a cam follower, may be changed in form as desired to enforce different types of movement upon the trim tab 12 as the aileron is moved above or below its neutral axis. For instance, if the curvature of the slot 25 were reversed, the trim tab 12 would move in the same direction to a greater degree than the aileron itself; also by altering the shape of the cam slots, the trim tab could be held in substantial alinement with the aileron through small ranges of movement of the latter and, upon further movement of the aileron the trim tab could be forced to move in the same or in the opposite direction with respect to the aileron to obtain respectively increased or decreased control effectiveness upon the airfoil. If increased control effectiveness is obtained, the control stick forces would of course be greater, whereas if the trim tab moves oppositely to the aileron, control stick forces would be decreased and a servo effect would be secured. To control the initial position of the trim tab 12, obvious expedients could be incorporated such as means for changing the length of the control rod 23 or for adjustably shifting the position of one or both of the cam slots 21 and 25.

As indicated at the start of the specification, the cam and cam follower control above described may be used in connection with elevators and rudders and the device may readily be set up to act as an antiflutter control for the movable control airfoils.

Since the slots 21 and 25 form the sole control for the relative movement of the trim tab, the simple plates 16 and 20, or one of the plates such as 20, may be readily replaced or altered in the initial flight test of an aircraft to secure optimum results without making major changes in the control organization; having determined the best form of cam for a particular airplane, the design of the plates may be stabilized for subsequent craft without requiring initial experimental and unorthodox testing apparatus.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an aircraft control system comprising a support, a controllably movable airfoil hinged thereto and a trim tab hinged to the airfoil rearward of the airfoil hinge; operating mechanism for the tab comprising cams on the support and airfoil, a cam follower constrained to follow both cams during movement of the airfoil relative to the support, and an operating connection from said cam follower to said trim tab.

2. In an aircraft control system comprising a controllably movable airfoil hinged to a support and a trim tab hinged to the airfoil rearward of the airfoil hinge, plates having cam slots in overlapping relation secured to the airfoil and support, a cam follower engaging both slots and movable relative to the plates upon airfoil movement with respect to the support, and an operating connection from the cam follower to the trim tab.

3. In an aircraft control system comprising a controllably movable airfoil hinged to a support and a trim tab hinged to the airfoil rearward of the airfoil hinge, plates having cam slots in overlapping relation secured to the airfoil and support, a cam follower engaging both slots and movable relative to the plates upon airfoil movement with respect to the support, an operating connection from the cam follower to the trim tab, the latter comprising a push-pull tube secured at one end to the cam follower, and a trim tab horn to which the other end of the tube is pivoted.

4. In an aircraft control system, a hinge plate having a hinge pin opening and a cam slot, a controllable airfoil having a plate having a hinge pin opening and a cam slot, a hinge pin engaging said pin openings, a cam pin engaging said cam slots and movable with respect to both plates upon movement of the airfoil relative to hinge plate, a trim tab pivoted to the airfoil, and a push-pull member secured to said cam pin and pivoted to said trim tab at a point spaced from the trim tab hinge axis.

5. In an aircraft control system, a support, a controllable airfoil hinged thereto, a slotted cam member on the support and on the airfoil the slots thereof being in overlapping relation, a cam follower engaging both cam slots and movable thereby relative to both support and airfoil upon airfoil movement, and an auxiliary movable airfoil with which said cam follower is operably connected.

6. In an aircraft control system, a support, a controllable airfoil hinged thereto, a member having a slot transverse to the flight line on the support, a member having a curved slot on the airfoil, the curve of said slot facing away from the airfoil hinge axis and said slots being in overlapping relation, a follower engaging within both said slots and movable with and with respect to the airfoil, and an auxiliary movable airfoil with which said follower is operably connected.

EDWARD R. CHILD.